United States Patent Office 2,799,630
Patented July 16, 1957

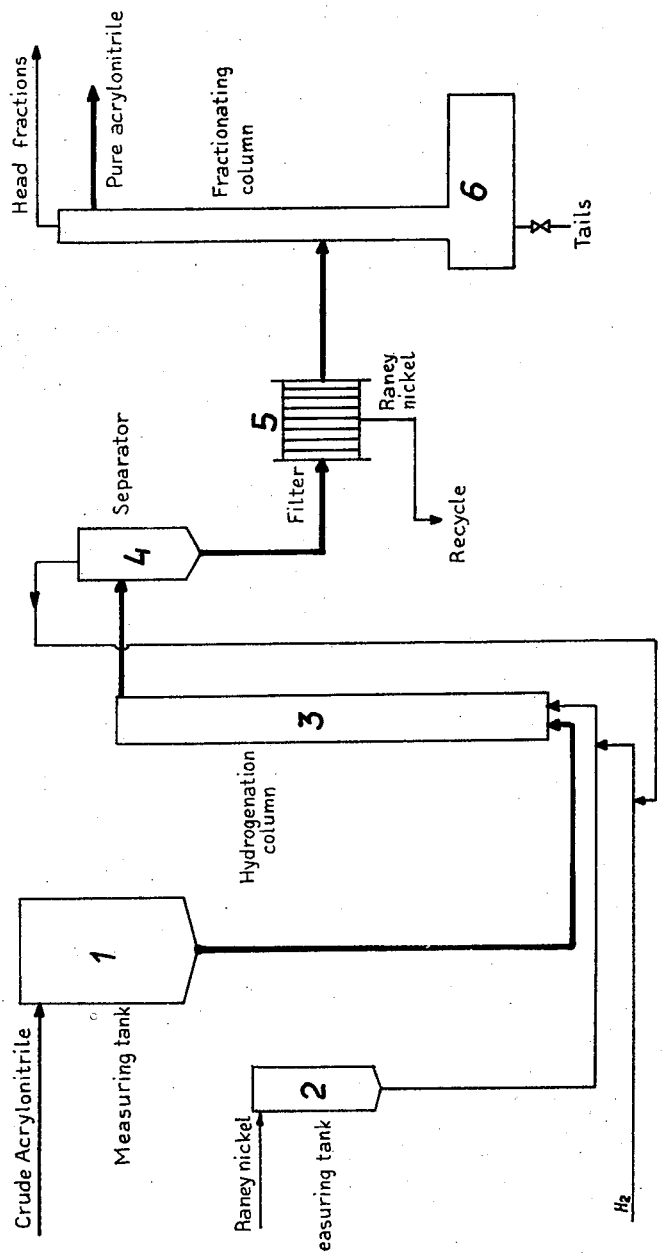

2,799,630

METHOD FOR PURIFYING ACRYLONITRILE FROM DIVINYLACETYLENE AND ETHYNIL-BUTADIENE BY MEANS OF SELECTIVE HYDROGENATION

Gerlando Marullo, Milan, Italy, assignor to Montecatini, Società Generale per l'Industria Mineraria e Chimica, a corporation of Italy Application July 1, 1954, Serial No. 440,863

Claims priority, application Italy July 8, 1953

4 Claims. (Cl. 202—59)

This invention relates to a method of purifying acrylonitrile obtained synthetically from acetylene and hydrogen cyanide. More particularly it relates to the removal of polymeric acetylene impurities, such as divinylacetylene and ethynilbutadiene, through selective hydrogenation.

It is known that various impurities are contained in acrylonitrile obtained by reacting hydrogen cyanide with acetylene, in the presence of catalysts based on cuprous salts, such as disclosed in German Patent No. 728,767. Since the catalyst employed promotes the polymerization of acetylene, the product is normally more or less contaminated with acetylene polymers, particularly monovinylacetylene, divinylacetylene and ethynilbutadiene, the isomer thereof. It is is also known that the presence of said acetylene hydrocarbons in the acrylonitrile is undesirable if nitrile polymers suitable for the manufacture of fibers etc. are to be obtained. A 0.2% divinylacetylene content, for example, may be very injurious. Normally, an impurity content of this type higher than 0.001% is objectionable.

While other impurities normally present in the acrylonitrile obtained from acetylene and hydrogen cyanide may be readily removed by means of fractionate distillation, a complete elimination of the aforesaid $C_6$ acetylene hydrocarbons is impossible in this manner since their boiling points are very close to that of acrylonitrile, and azeotropic mixtures with acrylonitrile are formed.

Therefore, various attempts have been made to obtain said separation by means of other physical or chemical processes; among them the dissolution of the acrylonitrile in water, and treatment either with sulfuric acid or chlorine may be mentioned.

Although such methods may result in a more or less complete purification, they present various disadvantages and cause losses of the desired product; this is especially the case if chemical treatments are used, which are often accompanied by saponification and polymerization of acrylonitrile.

Now it has been found that a complete removal of acetylene polymers may be achieved by means of an easy and inexpensive procedure, without losses of the desired product, by subjecting impure acrylonitrile to a hydrogenation in the presence of suitable catalysts.

It is known that acetylene hydrocarbons are readily reducible to olefines and saturated hydrocarbons. In the particular case of divinylacetylene and its isomer ethynilbutadiene, hydrogenation has been performed catalytically, e. g. either with Ni (U. S. Patent 2,156,396) at temperatures of 70–75° C., under 5–10 atm. pressure, or with Pd (Klebanskii et al., J. Gen. Chem., USSR, 16 (1946) 2083) at 20° C. under 20 atm.; 3-hexene being obtained in the first case and hexatriene in the second case.

Hexatriene is formed also either by electrolytic reduction or with sodium amalgam according to Klebanskii (J. Gen. Chem., USSR, 17 (1947), 1436). Moreover, hydrogenation has been performed in the presence of solvents and metal catalysts of various kinds, at temperatures between 15° and 150° C., under 10 atm. pressure (U. S. Patent 1,959,343).

On the other hand, acrylonitrile too may be hydrogenated rather easily to form propionitrile. Thus, Winans (U. S. Patent 2,334,140) carried out the hydrogenation with Raney Ni at 20–75° C., under a pressure of at least 6 atm. Under more drastic conditions and with other catalysts, propylamine can be easily obtained.

Under these circumstances one would expect that, although acetylene hydrocarbons add hydrogen more readily than acrylonitrile, conditions could not be found whereby a complete hydrogenation of divinylacetylene and its isomers could be obtained so as to permit their separation from the nitrile by means of distilling off these hydrogenation products which are more volatile than acrylonitrile, without any substantial losses of nitrile through a simultaneous hydrogenation to propionitrile.

Surprisingly, however, it was found that, by employing certain hydrogenation catalysts under particularly mild conditions, acetylene polymers are hydrogenized to an extent sufficient to insure their practically complete removal while no hydrogenation of the nitrile itself occurs, and the latter may be separated from the hydrogenation products by means of distillation and recovered in almost quantitative yields.

Among the catalysts which may be employed, all the Raney metals, particularly Ni and Co, as well as noble metals such as Pt and Pd, supported on inert carriers, have been found applicable.

The conditions under which the hydrogenation must be carried out in order to obtain the desired results may be varied within certain limits, depending upon the catalyst employed. Generally speaking the operation is advantageously performed at temperatures within the range of 0° to 50°, preferably at 20° C., under pressures varying from 1 to 20 atm., and at a contact time of less than 1 hour, preferably about 30 minutes.

Procedures resulting in the required hydrogenation are illustrated by the following examples, illustrating the advantageous results attainable through the process of this invention.

Example 1

5 parts of Raney Co washed with methanol are added to 300 parts of raw acrylonitrile containing 0.02% of divinylacetylene. The mixture is hydrogenated for 30 minutes in a 1 liter autoclave provided with a stirrer, at a temperature of 20° C., under $H_2$ pressure of 5 atm.

When the hydrogenation is completed, the catalyst is separated by decantation and distillation is carried out. The acrylonitrile obtained in almost quantitative yield contains no measurable amounts of divinylacetylene.

Example 2

Operating as in Example 1, with Raney Ni instead of Raney Co, the hydrogenation is carried out under normal pressure rather than 5 atm. The recovered nitrile is free of divinylacetylene.

A continuous operation may be used with good results by continuously introducing the impure nitrile, containing 5% of Raney Ni in suspension, into a stream of hydrogen.

As indicated by the attached schematic drawing, crude acrylonitrile is transferred from a measuring tank 1 to the bottom of a hydrogenation column 3 which, at the same time, is fed from the bottom with hydrogen gas of the required pressure and with appropriate amounts of catalyst, coming from measuring tank 2 suspended in acrylonitrile.

From the hydrogenation column the mixture passes to a separator 4 from the top of which hydrogen gas is recycled while the bottom effluent is transferred to a filter for removal and recycling of the catalyst. Entering the lower (reboiler) section of a fractionating column 6, pure acrylonitrile is separated from the hydrogenation products.

The process can be carried out at 20°, under normal pressure. At the reactor outlet the Raney Ni settles rapidly and can be recycled.

I claim:

1. A process for removing acetylene hydrocarbon impurities from acrylonitrile obtained synthetically from acetylene and hydrogen cyanide, which comprises intimately contacting, at room temperature for a period of 30 to 60 minutes, said impure acrylonitrile with hydrogen under 1 to 20 atm. pressure, in the presence of a catalyst taken from the group consisting of Raney cobalt, Raney nickel, platinum and palladium, and separating the hydrogenation products.

2. A process for removing acetylene hydrocarbon impurities from acrylonitrile obtained synthetically from acetylene and hydrogen cyanide, which comprises intimately contacting, at 20° C. and for a period of 30 minutes, said impure acrylonitrile with hydrogen under 5 atm. pressure, in the presence of about 1.5% Raney cobalt, and separating the hydrogenation products.

3. A process for removing acetylene hydrocarbon impurities from acrylonitrile obtained synthetically from acetylene and hydrogen cyanide, which comprises intimately contacting, a room temperature and for a period of 30 minutes, said impure acrylonitrile with hydrogen under 1 atm. pressure, in the presence of a catalytic amount of Raney nickel, and separating the hydrogenation products from acrylonitrile by distillation.

4. A process for removing acetylene hydrocarbon impurities from acrylonitrile obtained synthetically from acetylene and hydogen cyanide, which comprises suspending 5% of Raney nickel in a volume of impure acrylonitrile, intimately contacting, at 20° C. and for a time sufficient for the hydrogenation of said impurities, a stream of said suspension and a stream of hydrogen under 1 atm. pressure, collecting the suspension treated in this manner, permitting the catalyst to settle, separating the settled catalyst and adding it to a new volume of impure acrylonitrile.

References Cited in the file of this patent

UNITED STATES PATENTS 2,656,371      Baldwin et al.            Oct. 20, 1953